United States Patent
Weaver

(10) Patent No.: US 7,226,119 B1
(45) Date of Patent: Jun. 5, 2007

(54) SELF-CONTAINED ADJUSTABLE AIR FOIL AND METHOD

(76) Inventor: Darrick Charles Weaver, 9801 Nixon Dr., McKinney, TX (US) 75070

( * ) Notice: Subject to any disclaimer, the term of this patent is extended or adjusted under 35 U.S.C. 154(b) by 0 days.

(21) Appl. No.: 11/298,066

(22) Filed: Dec. 9, 2005

(51) Int. Cl.
*B60J 9/04* (2006.01)

(52) U.S. Cl. .................................................. 296/180.1

(58) Field of Classification Search ... 296/180.1–180.5
See application file for complete search history.

(56) References Cited

U.S. PATENT DOCUMENTS

| | | | |
|---|---|---|---|
| 2,979,165 | A | 4/1961 | McCambridge |
| 4,160,494 | A | 7/1979 | McCambridge |
| 4,214,786 | A * | 7/1980 | Morrison .................. 296/180.2 |
| 4,262,953 | A * | 4/1981 | McErlane ................. 296/180.4 |
| 4,313,635 | A * | 2/1982 | Front ....................... 296/180.3 |
| 4,364,531 | A | 12/1982 | Knoski |
| 4,375,898 | A * | 3/1983 | Stephens .................. 296/180.3 |
| 4,379,582 | A * | 4/1983 | Miwa ....................... 296/180.5 |
| 5,054,844 | A * | 10/1991 | Miwa ........................... 296/198 |
| 5,092,648 | A * | 3/1992 | Spears ...................... 296/180.3 |
| 5,275,249 | A * | 1/1994 | Nelson ....................... 180/69.2 |
| 5,287,004 | A | 2/1994 | Finley |
| 5,317,880 | A | 6/1994 | Spears |
| 5,522,637 | A | 6/1996 | Spears |
| 5,653,493 | A * | 8/1997 | Spears ...................... 296/180.2 |
| 6,099,069 | A | 8/2000 | Spears |
| 6,565,145 | B2 | 5/2003 | Pettey |
| 2004/0212219 | A1 | 10/2004 | Weaver |

FOREIGN PATENT DOCUMENTS

| | | |
|---|---|---|
| DE | 2501663 | 7/1976 |
| FR | 2362042 | 3/1978 |
| JP | 63 207777 | 8/1988 |
| JP | 2003 48425 | 2/2003 |

* cited by examiner

*Primary Examiner*—H Gutman
(74) *Attorney, Agent, or Firm*—Kevin Prince

(57) ABSTRACT

An auxiliary air foil device for mounting on a vehicle is disclosed. The air foil device includes an enclosure comprising a base plate, a plurality of side walls, and an air foil panel. The air foil panel is pivotable between an open position and a closed position. In the closed position, the outside air flow will be substantially isolated from the volume within the enclosure. The open position provides access from outside of the enclosure to a volume within the enclosure. An actuator interconnects the underside of the air foil panel with the interior side of the base plate and allows for selective moving of the air foil panel between the open and closed positions. The actuator is pivotably connected to the base plate and the air foil panel, such that as the actuator changes length the rotational position of the air foil panel with respect to the base plate is also changed. In use, depending upon the application desired, the auxiliary air foil device of the present invention may be used as an air brake for the vehicle, as a means for increasing air flow into an engines air intake or cooling systems, as an adjustable spoiler, as a vacuum source for exhaust or other systems, or the like. The air foil device may be oriented with the pivoted edge of the air foil panel oriented towards either the front or rear end of the vehicle, and apertures in the base plate may be connected through the vehicle surface to optional air ducting means for delivering additional airflow or requiring it.

15 Claims, 4 Drawing Sheets

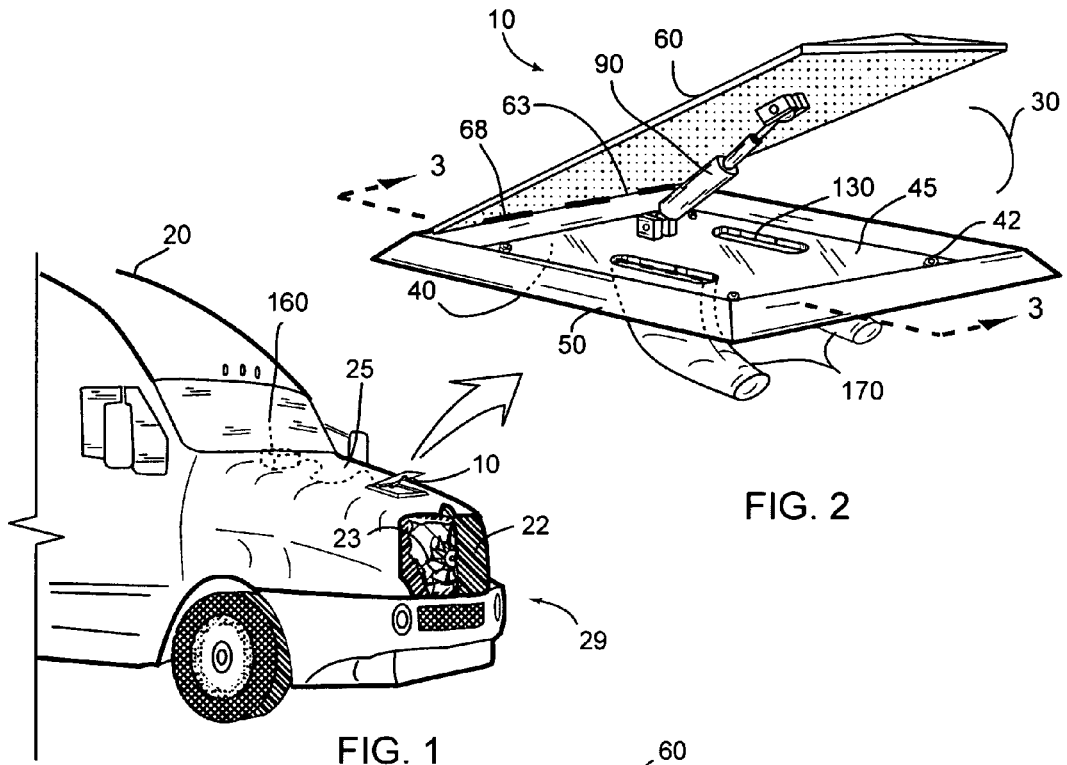
FIG. 1
FIG. 2
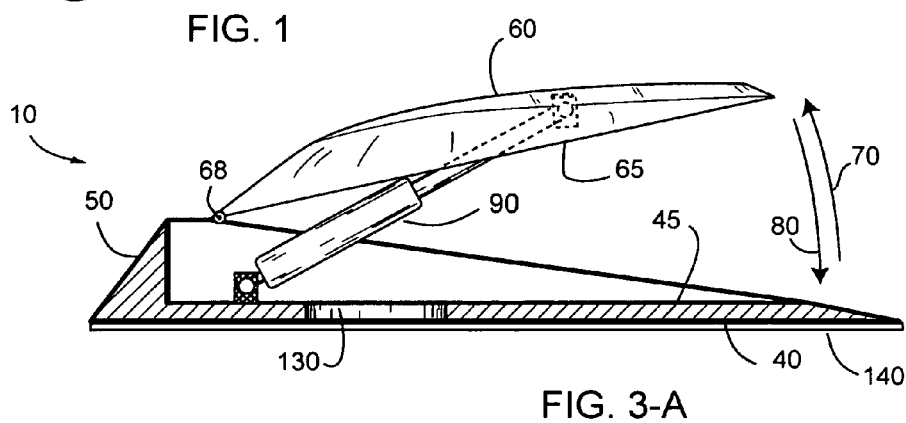
FIG. 3-A
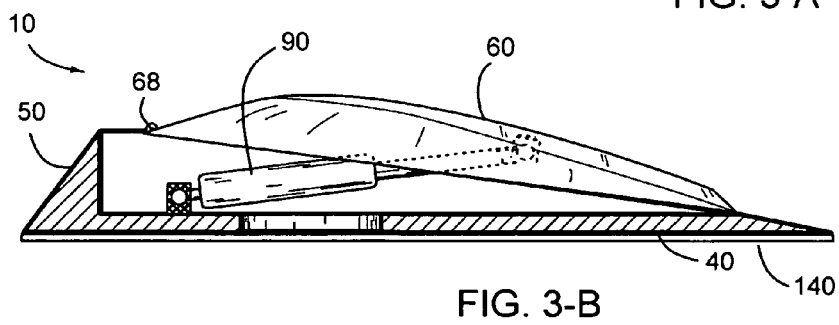
FIG. 3-B a minimum of damage to the outer surface of the vehicle. The present invention accomplishes these objectives.

SELF-CONTAINED ADJUSTABLE AIR FOIL AND METHOD

RELATED APPLICATIONS

The present invention is a continuation-in-part of US Patent Application 2004/0212219A1, filed on Apr. 22, 2003, which is hereby incorporated in its entirety by reference.

STATEMENT REGARDING FEDERALLY SPONSORED RESEARCH AND DEVELOPMENT

Not Applicable.

FIELD OF THE INVENTION

This invention relates to air foil devices for vehicles, and more particularly to a self-contained adjustable air foil for attaching to an existing vehicle, or the like.

DISCUSSION OF RELATED ART

Consumer automobiles and other vehicles rarely have active air foil systems installed that allow the vehicle to take advantage of the wind stream passing around the vehicle for use as added braking or air flow into the engine air intake or cooling systems. While some vehicles have static structures to direct air flow into the engine, such as static air scoops or the like, or for aerodynamically pulling the vehicle closer to the ground for better traction, few vehicles have active, moving means for directing air flow in a variable manner on an as-needed basis. Moreover, there are very few options for adding such an active air foil system on existing vehicles.

One prior art device, taught in U.S. Pat. No. 6,56,145 to Pettey on May 20, 2003, teaches an adjustable air foil mountable to a vehicle as an auxiliary spoiler. However, such a device is not well suited for other air foil applications, such as direction air into an engine cooling or air intake system, for example. Further, when such a device is in its un-deployed position for minimizing the amount of aerodynamic drag that it creates, a significant amount of additional drag is still created due to the open, uncovered design of such a device. The pivot points and actuator of such a device generate significant air resistance, and as such this device guarantees adding at least some aerodynamic drag regardless of whether or not its air foil is in a deployed or un-deployed position.

Another prior art device for selectively creating drag is taught in U.S. Pat. No. 6,099,069 to Spears on Aug. 8, 2000. This type of device is, however, reasonably good at presenting very little additional drag to the vehicle when in a closed position. However, this prior art device is not suitable for use on any vehicle other than a trucking cab, such as on automobiles or the like, due to its specific shape requirements for diverting airflow up and over a trailer. Further, use as an auxiliary air intake device for other applications is not contemplated.

Therefore, there is a need for a relatively inexpensive air foil device that can be attached to an existing vehicle and that is suitable for use in a variety of applications. Such a needed device would add very little aerodynamic drag when in an un-deployed or closed position, and would adequately add drag or redirect air flow into an engine for use in the cooling system or air intake system, or the like. Installation of such a device on an existing vehicle would result in a minimum of damage to the outer surface of the vehicle. The present invention accomplishes these objectives.

SUMMARY OF THE INVENTION

The present device is an auxiliary air foil device for mounting on a vehicle. The air foil device includes an enclosure comprising a base plate, a plurality of side walls, and an air foil panel. The base plate includes an interior side that is attached proximate to a lower edge of each of the side walls. One edge of the air foil panel is pivotably connected at a plurality of hinges to an upper edge of at least one of the side walls. As such, the air foil panel is pivotable between an open position and a closed position. In the closed position, the outside air flow will be substantially isolated from the volume within the enclosure.

The open position provides access from outside of the enclosure to a volume within the enclosure. Consequently, if the one edge of the air foil panel is oriented closest to a rear end of the vehicle, an underside of the air foil will act as a scoop to redirect air into the enclosure. On the other hand, if the one edge of the air foil panel is oriented closest to a front end of the vehicle, the air foil panel in the open position will act as a spoiler and will reduce air pressure at the underside of the air foil panel, resulting in a Venturi effect imparted upon the volume inside the enclosure.

An actuator interconnects the underside of the air foil panel with the interior side of the base plate and allows for selective moving of the air foil panel between the open and closed positions. The actuator is pivotably connected to the base plate and the air foil panel, such that as the actuator changes length the rotational position of the air foil panel with respect to the base plate is also changed.

In use, depending upon the application desired, the auxiliary air foil device of the present invention may be used as an air brake for the vehicle, as a means for increasing air flow into an engines air intake or cooling systems, as an adjustable spoiler, as a vacuum source for exhaust or other systems, or the like. The air foil device may be oriented with the pivoted edge of the air foil panel oriented towards either the front or rear end of the vehicle, and apertures in the base plate may be connected through the vehicle surface to optional air ducting means for delivering additional airflow or requiring it.

As such, the active air foil device of the present invention is extremely versatile as an add-on accessory for vehicles, particularly road vehicles. The present device adds very little aerodynamic drag when in an un-deployed or closed position, and adequately adds drag or re-directs air flow into an engine for use in the cooling system or air intake system, or the like. Installation of such a device on an existing vehicle results in a minimum of damage to the outer surface of the vehicle. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a perspective illustration of the invention, illustrating an auxiliary air foil device for selectively providing additional air flow into an engine cooling or air intake system;

FIG. 2 is a perspective illustration of the invention as shown in FIG. 1;

FIG. 3-A is a cross-sectional view of the invention, taken generally alone lines 3-3 of FIG. 2, and further illustrating an air foil panel in an open position;

FIG. 3-B is a cross-sectional view of the invention, taken generally alone lines 3-3 of FIG. 2, and further illustrating an air foil panel in a closed position;

DETAILED DESCRIPTION OF THE PREFERRED EMBODIMENT

Figure 4:
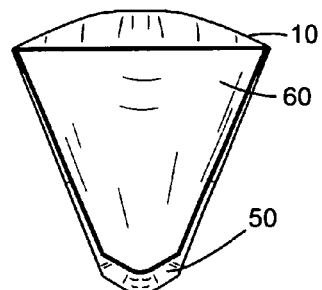
FIG. 4 is a top plan view of one embodiment of the invention wherein the air foil panel and a base plate are generally triangular in shape.

FIG. 1 illustrates an auxiliary air foil device 10 for mounting on a vehicle 20. The vehicle 20, such as a truck illustrated in FIG. 1, or a high performance automobile shown in FIG. 7, has an outer surface 25 that is suitably flat for mounting of the air foil device 10, the outer surface 25 being immediately adjacent to a stream of air flowing around the vehicle 20 when the vehicle 20 is in motion.

The air foil device 10 includes an enclosure 30 comprising a base plate 40, a plurality of side walls 50, and an air foil panel 60. The base plate 40 includes an interior side 45 that is attached proximate to a lower edge 55 of each of the side walls 50. One edge 63 of the air foil panel 60 is pivotably connected at a plurality of hinges 68 to an upper edge 57 of at least one of the side walls 50. As such, the air foil panel 60 is pivotable between an open position 70 and a closed position 80 (FIGS. 3-A and 3-B). In the closed position 80, the outside air flow will be substantially isolated from the volume within the enclosure 30.

The open position 70 provides access from outside of the enclosure 30 to a volume within the enclosure 30. Consequently, if the one edge 63 of the air foil panel 60 is downwind of the airflow, that is, oriented closest to a rear end 28 of the vehicle 20 when the vehicle 20 is moving in a forward direction, an underside 65 of the air foil panel 60 will act as a scoop to catch or redirect air into the enclosure 30.

On the other hand, if the one edge 63 of the air foil panel 60 is oriented closest to a front end 29 of the vehicle, the air foil panel 63 in the open position 70 will act as a spoiler and will reduce air pressure at the underside 65 of the air foil panel 60, resulting in a Venturi effect upon the volume inside the enclosure. Such a suction action may be desired in engine control systems, exhaust systems, cab environmental systems, refrigeration systems on trucks, or the like.

The base plate 40, side walls 50, and air foil panel 60 are all preferably made from a rigid and strong sheet metal or fiberglass panel material. As such, the air foil device 10 can withstand the significant aerodynamic forces imparted thereto, and the outside surfaces of the air foil device 10 may be painted or otherwise finished to match or augment the appearance of the vehicle 20.

Figure 8:
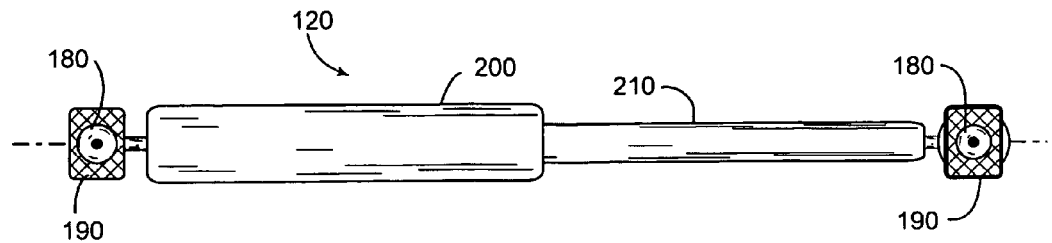
FIG. 8 is a top plan view of hydraulic actuator of the invention.
Figure 9:
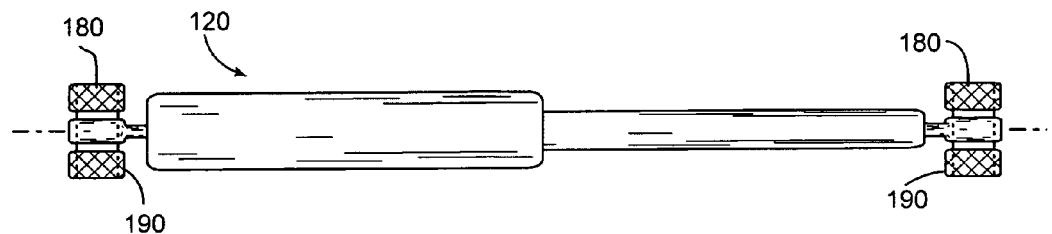
FIG. 9 is a bottom plan view of the actuator illustrated in FIG. 8.
Figure 10:
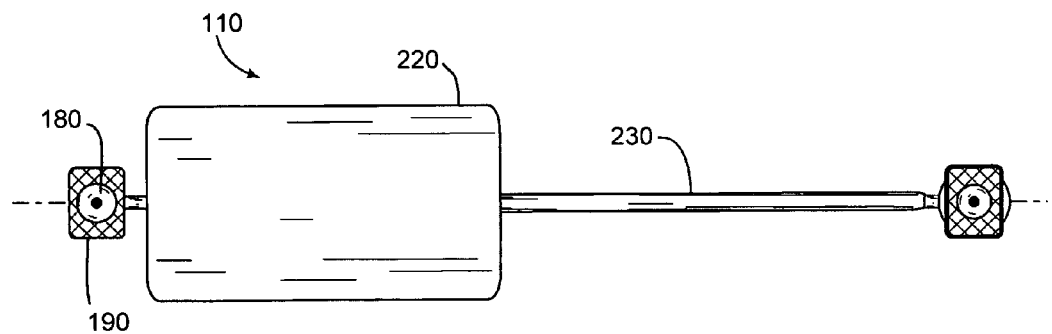
FIG. 10 is a top plan view of a pneumatic actuator of the invention.
Figure 11:
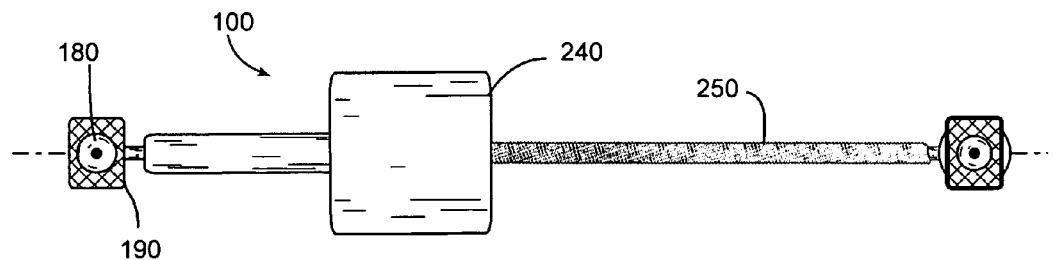
FIG. 11 is a top plan view of an electric in-line screw motor actuator of the invention.

An actuator 90 interconnects the underside 65 of the air foil panel 60 with the interior side 45 of the base plate 60. The actuator 90 allows for selective moving of the air foil panel 65 between the open and closed positions 70,80. The actuator 90 may be an electrically driven motor and screw assembly 100 (FIG. 11), such as is common in the art, that includes an electric inline screw motor 240 and a movable threaded rod 250. Both ends of such an actuator 90 are held to the base plate 40 and the air foil panel 60 by a journal block 190 and a journal 180. Alternately, the actuator 90 may be a pneumatic actuator 110 (FIG. 10) having pneumatic cylinder 220 and a pneumatic cylinder rod 230, or a hydraulic actuator 120 (FIGS. 8 and 9) having a hydraulic cylinder 200 and a hydraulic cylinder rod 210. The actuator 90 preferably includes an aerodynamic cover (not shown) for reducing drag forces experienced by the actuator 90 when the air foil panel is in the open position 70. The actuator 90 is pivotably connected to the base plate 40 and the air foil panel 60, such that as the actuator 90 changes length the rotational position of the air foil panel 60 with respect to the base plate 40 is also changed.

Figure 5:
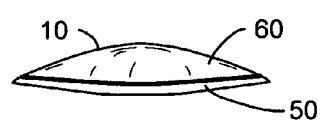
FIG. 5 is a front elevational view of the embodiment shown in FIG. 4.
Figure 6:
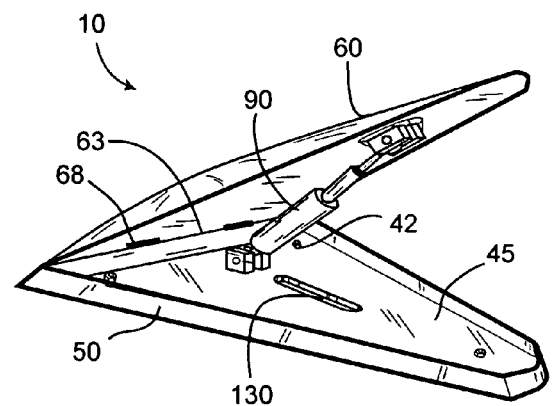
FIG. 6 is a perspective view of the embodiment shown in FIGS. 4 and 5.

In a preferred embodiment of the invention, the base plate 40 and the air foil panel 60 are each generally triangular in shape, and the plurality of side walls 50 numbers exactly three (FIGS. 4-6). In such an embodiment, the actuator 90 is centered with respect to the width of the base of the triangle, thereby providing balance between the forces affecting either side of the air foil panel 60.

Figure 7:
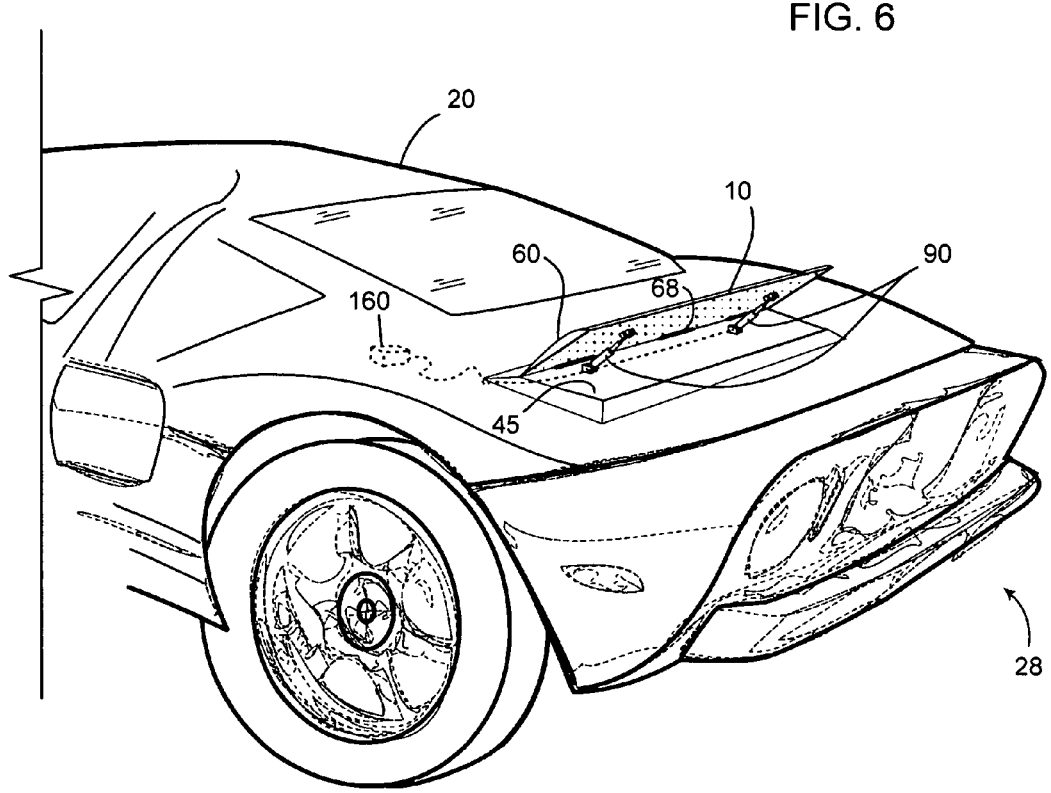
FIG. 7 is a perspective illustration of the invention, illustrating the auxiliary air foil device for selectively providing spoiling aerodynamic drag proximate the rear of a vehicle and wherein the base plate and air foil panel are generally rectangular in shape.

In an alternate embodiment of the invention, the base plate 40 and the air foil panel 60 are each generally rectangular or square, and the plurality of side walls 50 numbers exactly four (FIGS. 1, 2 and 7). In an elongated rectangular embodiment, illustrated in FIG. 7, the air foil panel 60 and the base plate 40 are each elongated rectangles, the length of which is substantially the length of the vehicle 20. In such an embodiment, the air foil device 10 acts as a rear spoiler for increasing the traction of the vehicle 20 and two actuators 90 are included.

Figure 12:
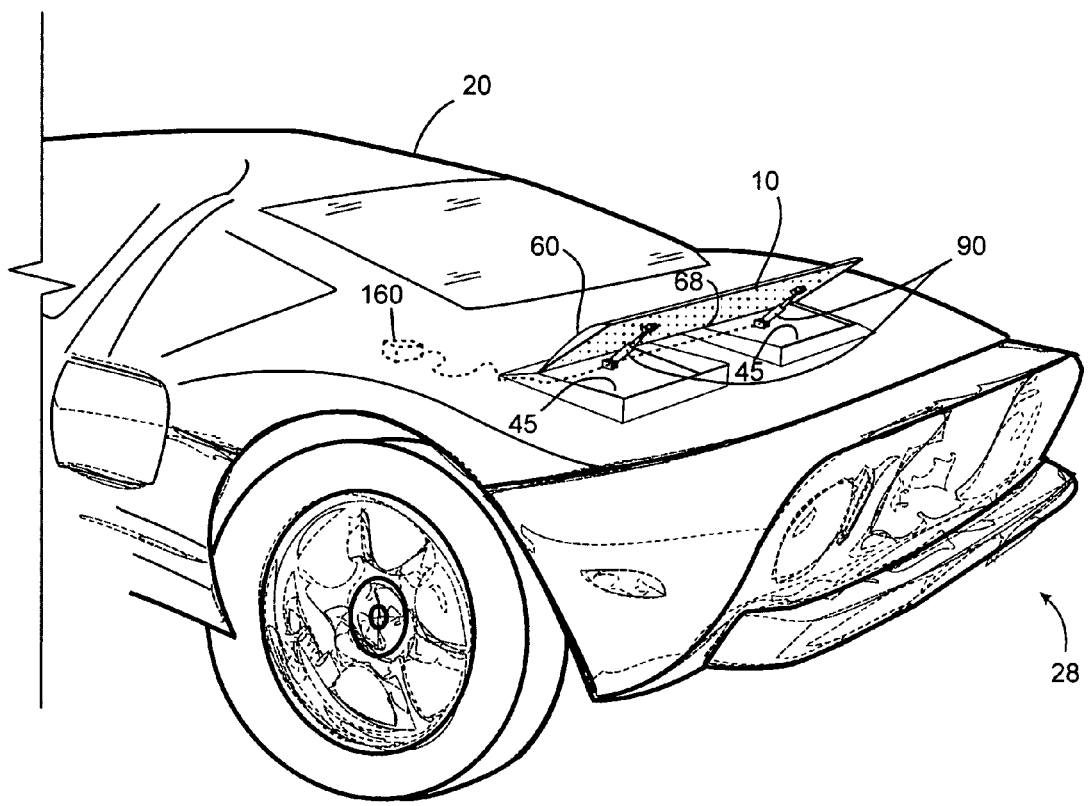
FIG. 12 is a further embodiment where the device is used as a vehicle spoiler and two enclosures may be included for surrounding each of two actuators.

In a further embodiment wherein the device 10 is used as a vehicle spoiler, two enclosures 30 may be included for surrounding each of two actuators 90 (FIG. 12). In such an embodiment the air foil panel 60 is supported by the two enclosures 30 and moved between the open and closed positions 70,80 by each actuator 90 cooperating together. Each enclosure 30 is aerodynamically shaped to reduce drag experienced by the vehicle 20.

In use for the application of providing selectively increasing drag on the vehicle 20, at least one auxiliary air foil device 10 is mounted to the outside surface 25 of the vehicle 20 with its one edge 63 of the air foil panel 65 oriented towards the rear 28 of the vehicle 20. The actuator 90 is operatively connected to a control device 160 for selectively causing the actuator 90 to move the air foil panel 60 between the open and closed positions 70,80 to impart more or less aerodynamic drag to the vehicle 20, respectively. The control device 160 may be a brake light signal wire, for example, or a manually controlled switch (not shown). A control line (not shown) may be fed through an aperture 130 of the base plate, through an aperture formed in the surface 25 of the vehicle 20 (not shown), in order to be connected to the control device 160. Alternatively, the actuator 90 may be battery powered and the control device may be a wireless control (not shown). Regardless, connecting an actuator 90 to a control device 160 is well known in the art, and any number of suitable methods may be employed.

In use for the application of providing selectively increasing airflow into a vehicle engine air intake system, at least one auxiliary air foil device 10 is mounted to the outside surface 25 of the vehicle 20 with its one edge 63 of the air foil panel 65 oriented towards the rear 28 of the vehicle 20. The actuator 90 is operatively connected to a control device 160 for selectively causing the actuator 90 to move the air foil panel 60 between the open and closed positions 70,80 to impart more or less airflow into the engine air intake system, respectively. The control device 160 may be a throttle control, for example, or a manually controlled switch (not shown).

In use for the application of providing selectively increasing airflow into a vehicle engine cooling system, at least one auxiliary air foil device 10 is mounted to the outside surface 25 of the vehicle 20 with its one edge 63 of the air foil panel 65 oriented towards the rear 28 of the vehicle 20. The actuator 90 is operatively connected to a control device 160 for selectively causing the actuator 90 to move the air foil panel 60 between the open and closed positions 70,80 to impart more or less airflow into the engine cooling system, respectively. The control device 160 may be an engine temperature sensor, for example, or a manually controlled switch (not shown).

In use for the application of providing a selective spoiling effect on a moving vehicle 20, at least one auxiliary air foil device 10 is mounted to the outside surface 25 of the vehicle 20 near the top rear 28 of the vehicle 20 with its one edge 63 of the air foil panel 65 oriented towards the front 29 of the vehicle 20. The actuator 90 is operatively connected to a control device 160 for selectively causing the actuator 90 to move the air foil panel 60 between the open and closed positions 70,80 to impart more or less airflow spoiling effect to the air flowing over the top of the vehicle 20. The control device 160 may be a brake light signal wire, for example, or a manually controlled switch (not shown).

With any of the foregoing embodiments of the invention, the air foil panel 60 may be smaller in area than the base plate 40, resulting in at least one sloped side wall 50. Such an air foil device 10 is more aerodynamic and results in less drag caused by the device 10. Further, a protective pad 140 (FIGS. 3-A and 3-B), such as a Teflon® or other suitably protective barrier may be used between the base plate 40 and the vehicle surface 25 to protect the vehicle surface 25 in the event that the air foil device 10 is ever removed from the vehicle 20. Ideally, the base plate 40 is bolted to the vehicle 20 with bolts 42 or other suitable fastening hardware. Alternately, high performance epoxy resins or other suitably strong adhesives may be used, provided same can withstand the substantial aerodynamic drag forces that the air foil device 10 is subjected to, particularly with the air foil panel 65 in the open position 70 and the vehicle 20 traveling at a high rate of speed.

Preferably, at least one aperture 130 is included in the base plate 40 for ingress of air into the vehicle 20 when the air foil panel 60 is not in the closed position 80. As such, an air duct 170 may be fixed between each aperture 130 and an engine air intake system 22 or an engine cooling system 23 for providing additional airflow to these engine systems. Such additional air flow is not limited to engine systems, but could also be used for added air flow into environmental systems such as air conditioning or heating units (not shown).

While a particular form of the invention has been illustrated and described, it will be apparent that various modifications can be made without departing from the spirit and scope of the invention. For example, a variety of shapes of base plates and air foil panels may be used. Further, a variety of types of actuators may be used. Accordingly, it is not intended that the invention be limited, except as by the appended claims.

What is claimed is:

1. An auxiliary air foil device for mounting on a vehicle having an outer surface, the air foil device comprising:
   an enclosure comprising a base plate, a plurality of side walls, and an air foil panel, the base plate mounted to the outer surface of the vehicle, an interior side of the base plate attached proximate to a lower edge of each side wall, one edge of the air foil panel pivotably connected to an upper edge of at least one of the side walls, the air foil panel pivotable between an open position wherein a volume within the enclosure is accessible from outside of the enclosure, and a closed position wherein the volume within the enclosure is substantially isolated from outside of the enclosure; and
   an actuator interconnecting an underside of the air foil panel with the interior side of the base plate, the actuator for selectively moving the air foil panel between the open and closed positions.

2. The auxiliary air foil device of claim 1 wherein the actuator is an electrically driven motor and screw assembly.

3. The auxiliary air foil device of claim 1 wherein the actuator is a pneumatic actuator.

4. The auxiliary air foil device of claim 1 wherein the actuator is a hydraulic actuator.

5. The auxiliary air foil device of claim 1 wherein the base plate and air foil panel are each generally rectangular in shape, and the plurality of side walls numbers exactly four.

6. The auxiliary air foil device of claim 5 wherein the air foil panel is substantially larger than the base plate, and further including a second enclosure comprising,
   a second base plate, a plurality of second side walls, an interior side of the second base plate attached proximate to a lower edge of each second side wall, one edge of the air foil panel pivotably connected to an upper edge of at least one of the second side walls, the air foil panel pivotable between the open position wherein a volume within the second enclosure is accessible from outside of the second enclosure, and the closed position wherein the volume within the second enclosure is substantially isolated from outside of the second enclosure; and
   a second actuator interconnecting an underside of the air foil panel with the interior side of the second base plate, the actuator and the second actuator both cooperating for selectively moving the air foil panel between the open and closed positions.

7. The auxiliary air foil device of claim 1 wherein the base plate and air foil panel are each generally triangular in shape, and the plurality of side walls numbers exactly three.

8. The auxiliary air foil device of claim 1 wherein the air foil panel is smaller in area than the base plate, and wherein each side wall is slanted, such that the air foil device presents reduced aerodynamic drag.

9. The auxiliary air foil device of claim 1 wherein the base plate further includes at least one aperture for ingress of air into the vehicle when the air foil panel is not in the closed position.

10. A method of selectively increasing airflow into a vehicle engine air intake system, comprising:
   a.) providing an auxiliary air foil device as recited in claim 9;
   b.) mounting the auxiliary air foil to an outside surface of the vehicle;
   c.) providing an air duct between the aperture of the base plate of the auxiliary air foil device and the engine air intake system;
   d.) connecting the actuator to a control device for selectively causing the actuator to move the air foil panel between the open and closed positions to impart more or less airflow into the engine air intake system, respectively.

11. The method of claim 10 wherein steps (c) and (d) are reversed.

12. A method of selectively increasing airflow into a vehicle engine cooling system, comprising:
   a.) providing an auxiliary air foil device as recited in claim 9;
   b.) mounting the auxiliary air foil to an outside surface of the vehicle;
   c.) providing an air duct between the aperture of the base plate of the auxiliary air foil device and the engine cooling system;
   d.) connecting the actuator to a control device for selectively causing the actuator to move the air foil panel between the open and closed positions to impart more or less airflow into the engine cooling system, respectively.

13. The method of claim 12 wherein steps (c) and (d) are reversed.

14. The auxiliary air foil device of claim 1 further including a protective pad for mounting between the vehicle and the base plate.

15. A method of selectively increasing aerodynamic drag on a vehicle, comprising:
   a.) providing an auxiliary air foil device as recited in claim 1;
   b.) mounting the auxiliary air foil to an outside surface of the vehicle with the one edge of the air foil panel oriented towards the rear of the vehicle;
   c.) connecting the actuator to a control device for selectively causing the actuator to move the air foil panel between the open and closed positions to impart more or less aerodynamic drag to the vehicle, respectively.

* * * * *